(12) United States Patent
Fleming et al.

(10) Patent No.: US 7,540,433 B2
(45) Date of Patent: *Jun. 2, 2009

(54) INSECT CONTROL SYSTEM AND METHOD

(75) Inventors: John Fleming, Sandia, TX (US); Eileen Fleming, Sandia, TX (US)

(73) Assignee: TMC Systems, L.P., Hosuton, TX (US)

( * ) Notice: Subject to any disclaimer, the term of this patent is extended or adjusted under 35 U.S.C. 154(b) by 303 days.

This patent is subject to a terminal disclaimer.

(21) Appl. No.: 11/412,647

(22) Filed: Apr. 27, 2006

(65) Prior Publication Data

US 2006/0196576 A1 Sep. 7, 2006

Related U.S. Application Data

(63) Continuation-in-part of application No. 10/696,596, filed on Oct. 29, 2003, now Pat. No. 7,066,218.

(51) Int. Cl.
*A01G 7/00* (2006.01)
*A01G 27/00* (2006.01)

(52) U.S. Cl. .............................. 239/69; 239/63; 239/64; 239/67; 141/198

(58) Field of Classification Search ............. 239/67–71, 239/74, 63, 64, 337, 349, 351, 208; 141/198
See application file for complete search history.

(56) References Cited

U.S. PATENT DOCUMENTS

| 4,015,366 | A | * | 4/1977 | Hall, III | 47/1.43 |
| 4,569,020 | A | * | 2/1986 | Snoddy et al. | 700/284 |
| 7,066,218 | B1 | * | 6/2006 | Fleming et al. | 141/198 |

* cited by examiner

*Primary Examiner*—Davis Hwu
(74) *Attorney, Agent, or Firm*—Jackson Walker, LLP

(57) ABSTRACT

The present invention provides an automated insect control system. The system utilizes a container tank, a canned pump, distribution system, and a programmable digital timer to allow a user to control the times per day and the duration in which to apply insecticide to an area. A remote control is provided which permits a user to commence and terminate spraying of insecticide as the need arises without resorting to reprogramming of the spraying schedule.

34 Claims, 12 Drawing Sheets

INSECT CONTROL SYSTEM AND METHOD

This patent application is a continuation-in-part of and claims priority from application Ser. No. 10/696,596 filed on Oct. 29, 2003 now U.S. Pat. No. 7,066,218. This patent application incorporates by reference application Ser. No. 10/696,596 as if it were fully printed herein.

FIELD OF THE INVENTION

Applicants' invention relates generally to the field of insect control. More specifically, Applicants' invention relates to automated insect control systems.

BACKGROUND

The invention relates to a system for the control of insects. In particular, the invention is a spraying system comprising a container for insecticide, a pump, a programmable digital timer, and a distribution system to allow the insecticide to be distributed over a wide area.

Controlling the insect population over a wide area is important to the quiet enjoyment of a social gathering or for the protection of goods and property. Controlling the insect population over a wide area is also important to the control of the spread of diseases such as mosquito-borne West Nile Virus and Rift Valley Fever. The Centers for Disease Control and Prevention reports that 44 of the 48 contiguous United States have seen incidences of human infection of West Nile Virus and that all 48 contiguous United States have seen avian or animal infections of the disease.

However, the use of traditional methods of applying insecticide has proven ineffective to control insect population over an extended period of time because the effect of an insecticide diminishes over time and insect population and activity varies over time. As a result, the application of proper amounts of insecticide is difficult and cumbersome.

Thus, there exists a need for an insect control system which allows a user to vary the application of insecticide in terms of time and volume. Further, such a system should allow for the instant application of a selected volume of insecticide for a selected period of time to respond to immediate and changing conditions.

The general field of insect sprayers is rich with disclosure and invention. Mainly because the public has been battling insects since the dawn of time.

U.S. Pat. No. 5,931,207 to Gianino discloses a portable home and garden sprayer with a power unit. A hand-held compressed air power unit is used for spraying liquids from a tank. Because of the construction of the device, user intervention is required to make the device function.

U.S. Pat. No. 4,202,498 to Lestradet discloses a mobile insecticide sprayer. The apparatus allows for the spraying of insecticide while mounted on agricultural machines which are equipped to regulate the flow of the insecticide. Because of the construction of the device, the device is not an automated system and user intervention is required to make the device function.

U.S. Pat. No. 4,945,673 to Lavelle discloses a centralized extermination system. The system comprises chambers that are permanently placed at various positions in the walls of a building. Each chamber comprises a duct having an open proximal end and holes in its sides. When insecticide is sprayed through the nozzle, the nozzle evenly disperses the insecticide through the holes in the chamber to reach the cavity of the wall. This system lacks a storage device to hold insecticide and requires user intervention to make the device function.

U.S. Pat. No. 3,979,063 to Query discloses an insecticide spray system that comprises a main conduit with branch conduits. Each conduit has a normally closed nozzle with a solenoid actuated valve. The solenoids are all connected through a timer to a power source. An insecticide-gas propellant mixture is disclosed which sprays insecticide when the solenoids are opened by the timer.

While these units may be suitable for the particular purposes employed, or for general use, they would not be as suitable for the purposes of the present invention as disclosed hereafter. In particular, they lack automation, programmability, a manual override with remote control, and other features. Each of the above referenced disclosures requires manual intervention to dispense insecticide or require the use of high pressure gas systems.

SUMMARY OF THE INVENTION

In accordance with the present invention, an Insect Control System is provided which substantially eliminates or reduces the disadvantages and problems associated with previous systems and methods.

In accordance with one aspect of the present invention, a system is provided comprising a container for containing a liquid insecticide, a distribution system for delivering the liquid insecticide from the container to a plurality of remote locations, a pump in operable engagement with the distribution system for pumping the liquid insecticide from the container to the remote locations, and a programmable digital timer to control the pump. The liquid insecticide can be a safe, natural insecticide such as Pyrethrum, a Chrysanthemum extract.

Applicants enhance the field of insect sprayer systems with their novel combination of pre-programmed, unattended operation and distribution of insecticide, and the ability to manually dispense an selected amount of insecticide at any time and low-cost, reliable operation.

Applicants achieve greater control and accuracy of insecticide distribution through the use of a programmable digital timer which permits unattended spraying of insecticide. The efficiency of Applicants' time-targeted application decreases the amount of insecticide that needs to be applied to an area at any selected time to control the area's insect population.

Further, Applicants achieve more economical insecticide distribution through the use of a canned pump and a remote control on/off switch. A canned pump is an integrated pump and motor sealed within a case. A representative model of a canned pump is the Procon Model 7400. The remote control on/off switch permits a user to apply a selected amount of insecticide at a selected time. This capability reduces the temptation of a user to over-apply insecticide to ensure the eradication of insects in a given area.

BRIEF DESCRIPTION OF THE DRAWINGS

For a more complete understanding of the present invention and the advantages thereof, reference is now made to the following description taken in conjunction with the accompanying drawings in which like reference numbers indicate like features, and where in.

DETAILED DESCRIPTION

Figure 1:
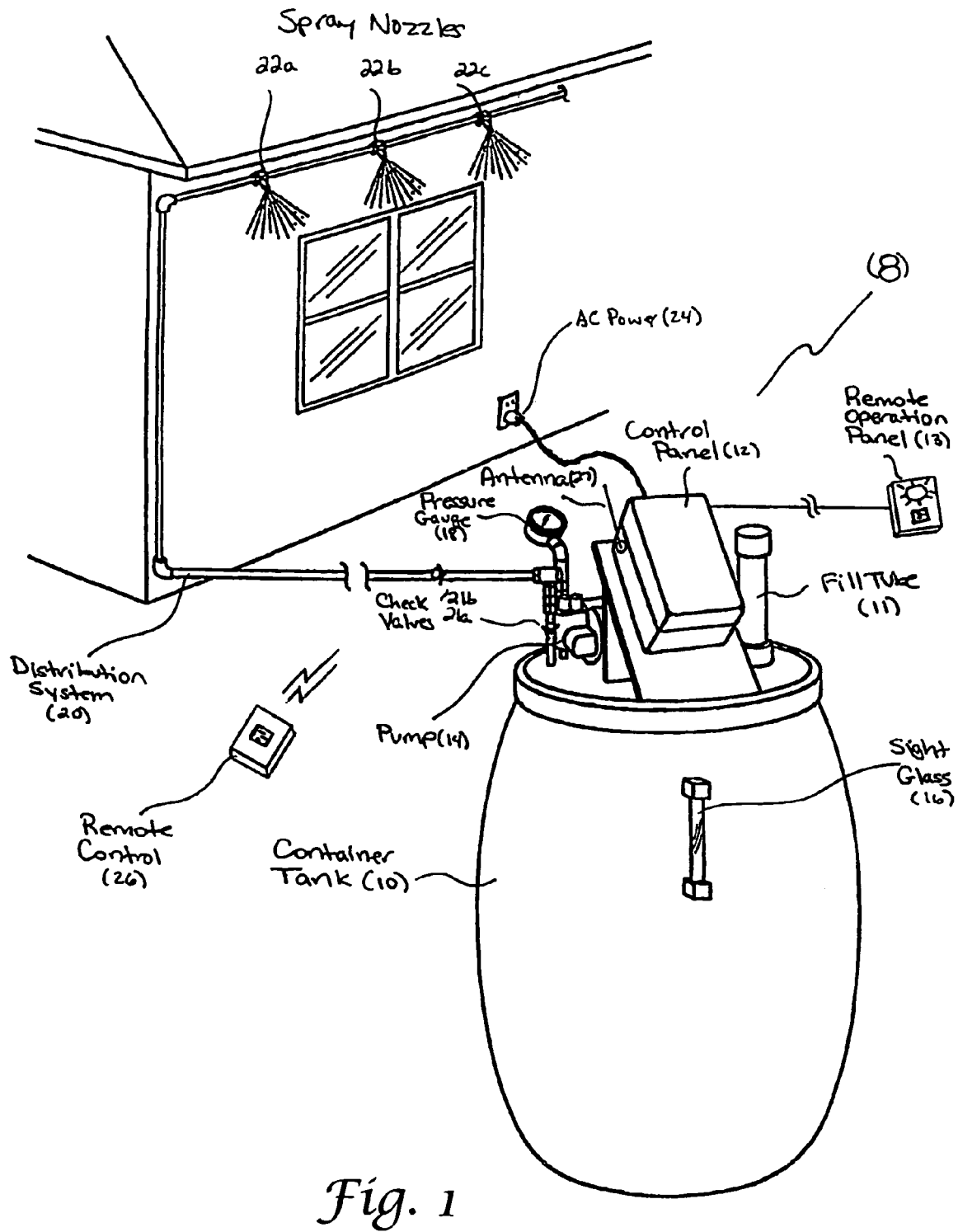
FIG. 1 illustrates a perspective view of one embodiment of the insect spray system.

Referring to the figures, FIG. 1 illustrates a first embodiment of Applicants' insect control sprayer system (8). The figure shows the container tank (10), the control panel (12), and the canned pump (14). Insecticide may be poured into the container tank (10) via the fill tube (11). The level of insecticide within the container tank (10) may be visually determined by inspection of the sight glass (16). The control panel (12) may be programmed for a minimum of 0 to a maximum of 288 spraying intervals in any given 24 hour period. Each spray interval may have a duration ranging from 1 second to 99 seconds. The pressure gauge (18) displays the pressure of the insecticide being pumped by a pump (14) to the distribution system (20).

Figure 1A:
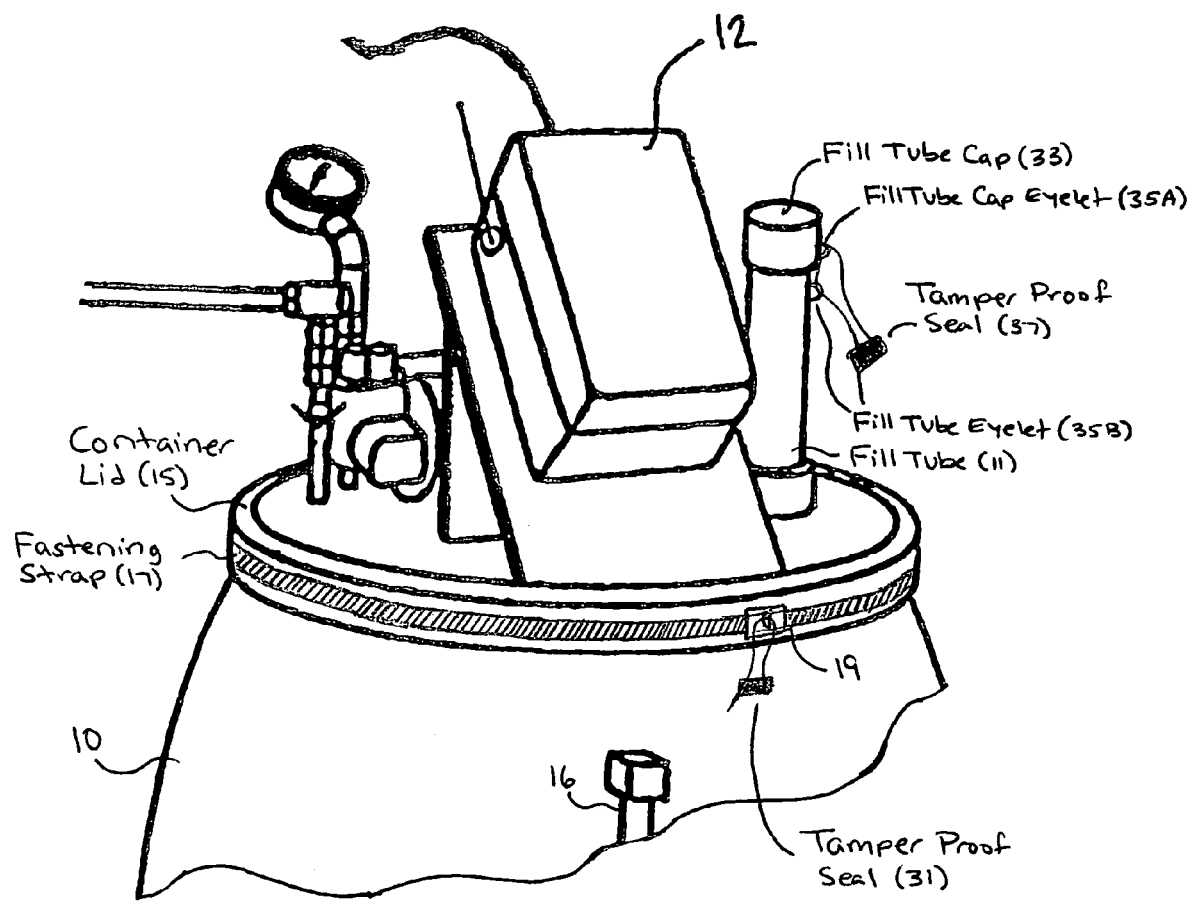
FIG. 1A illustrates a partial perspective view of the upper portion of one embodiment of a container tank of the insect spray system.

The pump (14) may be a canned pump or may be a standard rotary vane pump coupled with an electric motor adapted for pumping water and moderate aggressive liquids with low flow at high pressure. The pump (14) may be integrated into the insect control spray system (8), for example, mounted upon container lid (15) as shown in FIG. 1A, or the pump (14) may be positioned within the container tank (10), or the pump (14) may be external and apart from the container tank (10) and the container lid (15), drawing insecticide from the container tank (10) via an attached hose. In one such embodiment, examples of pumps that are suitable for use with the instant insect control sprayer system (8) are the Procon Series 4 or 5 Brass rotary Vane Pump or a Fluid-O-Tech PO/PA Brass rotary Vane Pump powered by a ⅓-1 horsepower, or larger, electric motor.

Although FIG. 1 shows the distribution system (20) as being attached to the exterior of a home, it should be noted that the distribution system may be mounted within the walls during the construction of a building with only the nozzles (22) being visible. The pump (14) pumps insecticide through the distribution system (20) where the insecticide is expelled in appropriate locations by spray nozzles (22). Check valves (21) ensure that insecticide does not flow back into the pump (14) or the container tank (10). The entire system draws power from an AC power source (24). However, a battery backup for the control panel (12) is provided (Element 38 on FIG. 2). A user may remotely commence and terminate the spraying of insecticide via a wireless remote control (26). A hardwired remote operation panel (13) is also provided to remotely commence and terminate the spraying of insecticide.

The wireless remote control (26) and the hardwired remote operation panel (13) may operate in one of two modes. In the first mode, depressing a button on either remote (13 or 26) will cause the pump (14) to be energized and commence the spray of insecticide. The pump (14) will remain energized only so long as the button on the remote (13 or 26) is depressed. Once the button is released, the pump (14) is de-energized and the spray of insecticide terminates. In the second mode, depressing a button on either remote (13 or 26) will cause the pump (14) to be energized and commence the spray of insecticide. In this mode, releasing the button does not de-energize the pump. Rather, the button on the remote (13 or 26) must be depressed a second time to terminate the spraying of insecticide. In either mode, the signal generated by either remote (13 or 26) is received by the control panel via the control panel antenna (27) in the case of the wireless remote control (26) or directly in the case of the hardwired remote operation panel (13). To commence the spraying of insecticide, whether in response to a signal from the remote control (13 or 26) or due to user scheduling, the control panel (12) closes a normally open circuit to energize the pump (14).

Referring now to FIG. 1A wherein it is seen a partial perspective view of the upper portion of the container tank (10) of the insect control sprayer system (8). In this view it is seen that container lid (15) is securely mounted in place atop the container tank (10) by a fastening strap (17). The fastening strap (17) comprises a latching mechanism (19) at the proximal and distal ends thereof. When the fastening strap (17) is in place about the container lid (15) and the latching mechanism (19) is engaged, the container lid (15) may not be removed from the container tank (10). The latching mechanism (19) may be locked in its engaged position by a tamper proof seal (31) such as with VMS Products' Sentry Cable Seal to prevent removal of the container lid (15) by unauthorized persons.

It is further seen in FIG. 1A that a fill tube cap (33) engages with and covers the distal end of the fill tube (11). The fill tube (11) and the fill tube cap (33) may further comprise eyelets (35A, 35B) adapted to receive tamper proof seal (37) to prevent removal of the fill tube cap (33) by unauthorized persons.

Figure 2:
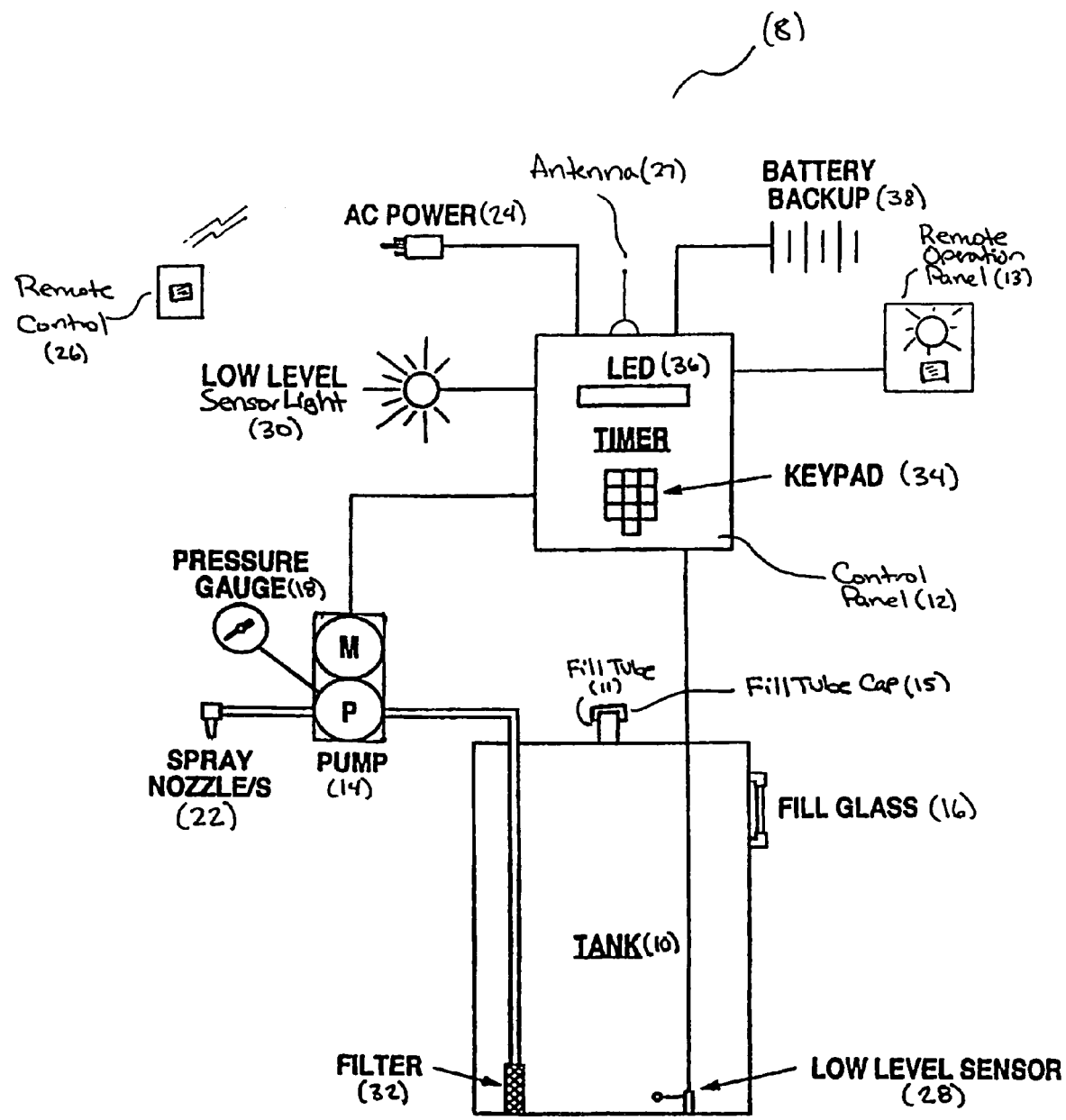
FIG. 2 illustrates an equipment diagram of one embodiment of the insect spray system.

FIG. 2 is an equipment diagram of Applicants' insect control sprayer system (8). Backup power is supplied to the control panel via a battery backup (38) to preserve user settings in the event that AC power (24) fails. A low level sensor (28) within container tank (10) detects when the insecticide reaches a first low level. Upon reaching the first low level, the low level sensor (28) sends a signal to the control panel (12) which causes the low level sensor light (30) to illuminate. When the insecticide level reaches a second low level, the low level sensor (28) sends a signal to the control panel (12) which then prevents further operation of the pump (14) until the low level sensor (28) terminates its signal. A filter (32) prevents contaminants from entering the distribution system (20). Referring to the control panel (12), a user accesses the features of the control panel (12) via the control panel keypad (34) and information is displayed to the user on the control panel display (36).

Figure 3:
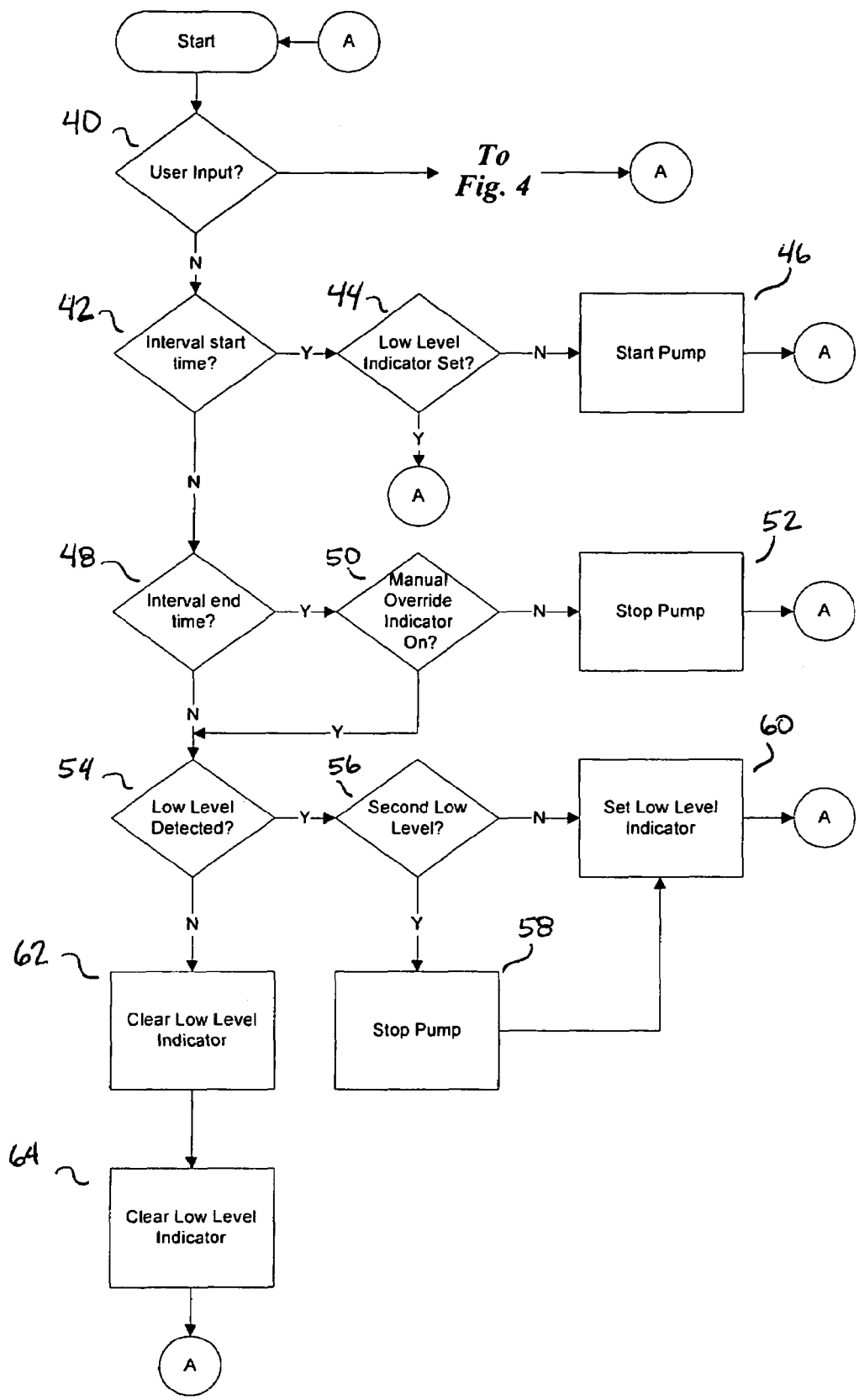
FIGS. 3 and 4 are process flow diagrams illustrating the control process of one embodiment of the present invention.
Figure 4:
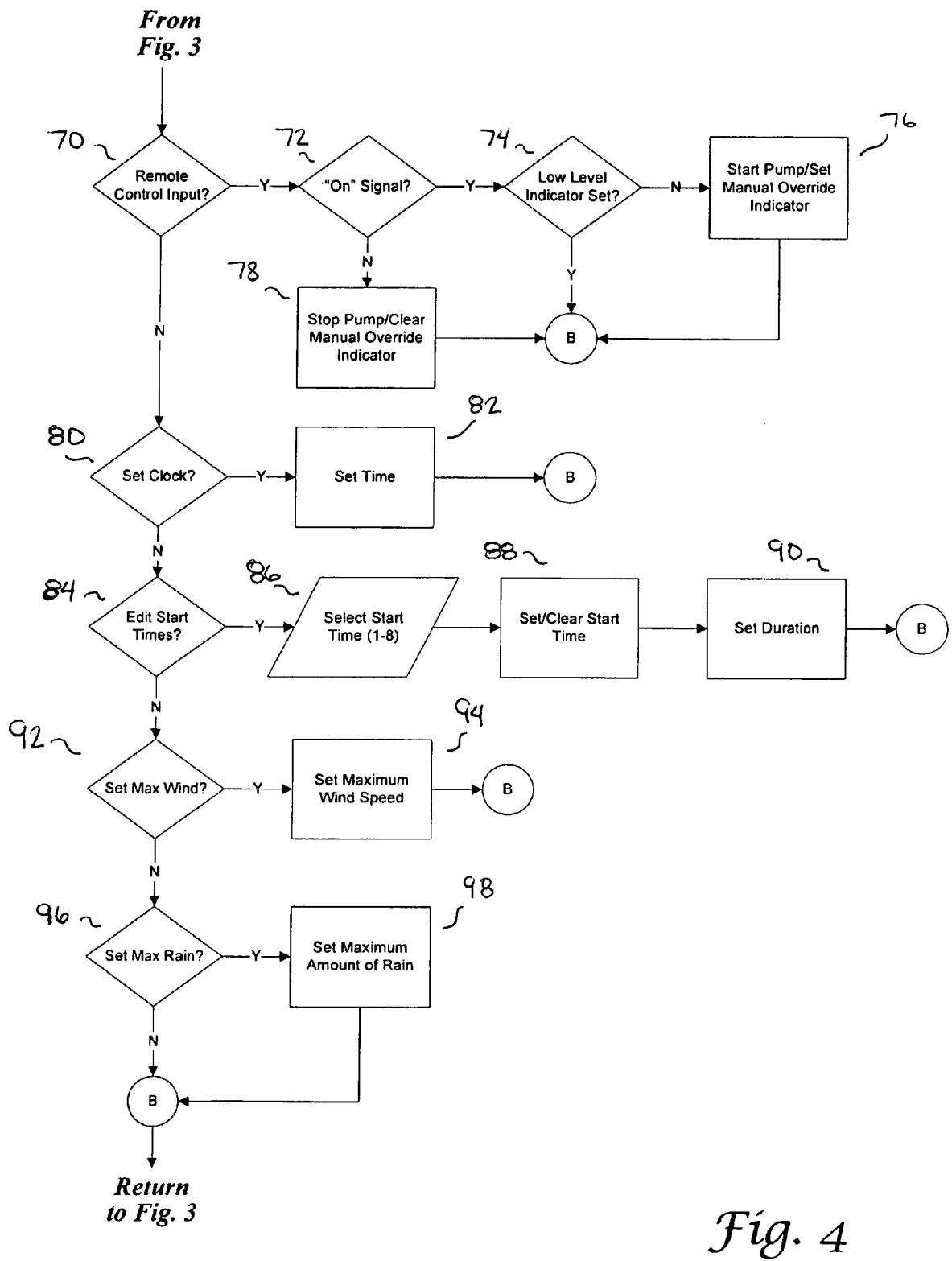

Referring to FIGS. 3 and 4, a computer system controls Applicants' insect control spray system. If the computer system does not detect user input, Box 40, it compares the current time to the stored start intervals to determine whether spraying of insecticide should commence, Box 42.

If an interval start time has been reached, Box 42, the system checks for a signal from the low level sensor (28), the wind speed as measured by the anemometer (120), and the total rain fall as measured by the rain gauge (122), Box 44. If the low level sensor (28) is not set, the wind speed does not exceed the maximum programmed by the user, and the programmed maximum amount of rainfall has not been exceeded, the pump (14) is energized causing insecticide to flow through the distribution system (20) and spray from the nozzles (22). If the low level sensor (28) is set, the wind speed does exceed the maximum programmed by the user, or the programmed maximum amount of rainfall has been exceeded, the system does nothing.

If an interval end time has been reached, Box 48, the system determines whether the user has manually overridden the system to cause the system to spray insecticide. If the user has manually overridden the system, Box 50, the system is allowed to continue spraying. Otherwise, the pump is de-energized, Box 52.

If the system detects that the low level sensor (28) is set, Box 54, the system determines whether the insecticide level has reached the first low level or the second low level, Box 56. If the insecticide has reached the first low level, the system sets the low level indicator, Box 60, and causes the low level sensor light (30) to illuminate. If the insecticide has reached the second low level, the system first stops all pumping activity, Box 58, and then sets the low level indicator, Box 60, and causes the low level sensor light (30) to illuminate. If the system detects that the low level sensor (28) is not set, it clears the low level indicator is and darkens the low level sensor light, Box 62. Finally, the system retrieves and records wind speed information from the anemometer (120) and rainfall information from the rain gauge (122), Box 64.

Referring back to Box 40, if the system detects user input, the system determines whether the input was from the remote control (26) or from the control panel keypad (34).

If the input is from the remote control, Box 70, the system determines whether the user desires to commence or terminate spraying insecticide, Box 72. If the user desires to terminate spraying, the system stops the pump (14) and clears the manual override indicator, Box 78. If the user desires to commence spraying, the system determines whether the low level sensor (28) is set, Box 74. If the low level sensor (28) is not set, the system energizes the pump (14) and sets the manual override indicator, Box 76.

If the user input is from the control panel keypad (34) and the user desires to set the current time, Box 80, the system prompts the user for the current time and date and accepts the time and date from the user, Box 82. If the user input is from the control panel keypad (34) and the user desires to set or clear spray intervals, Box 84, the system prompts the user for the interval to set or clear, Boxes 86 and 88, and prompts the user for the spray duration if the user is setting a spray interval, Box 90. The user may program up to a maximum of 288 spraying intervals for any given 24 hour period and each spraying interval may have a duration of 1 second to 99 seconds. In some embodiments of the present invention, the control panel (12) may verify that newly programmed spraying intervals do not overlap a subsequent or prior spraying interval. If the user input is from the control panel keypad (34) and the user desires to set the maximum wind speed below which the insect control spray system (8) will operate, Box 92, the system prompts the user for the maximum wind speed, Box 94. If the user input is from the control panel keypad (34) and the user desires to set the maximum amount of rainfall below which the insect control spray system (8) will operate, Box 92, the system prompts the user for the maximum amount of rainfall within a defined period of time, Box 98. The rainfall amount may be set in one-hundredth's of an inch increments and may range from 0.01 inch through a maximum of 99.99 inches. The period of time during which the rainfall is measured may range from a minimum of 30 minutes to a maximum of one week.

Figure 5:
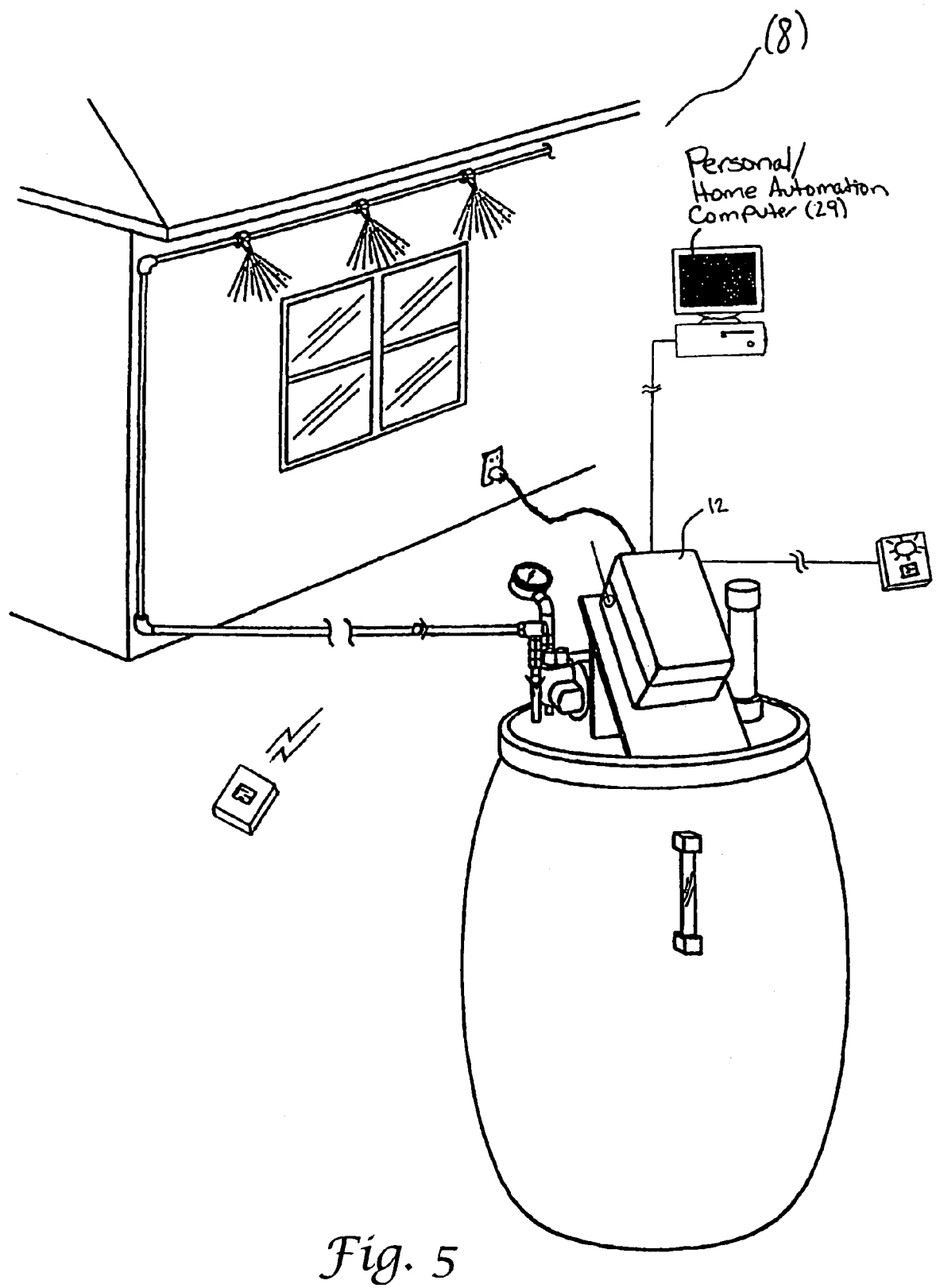
FIG. 5 illustrates a perspective view of an alternative embodiment of the insect spray system wherein a home computer or a home-automation computer is operable to control the insect spray system.

FIG. 5 illustrates an alternate embodiment of Applicants' insect control sprayer system (8). In this embodiment, a programmable computer (29) communicates with the control panel (12) to offer enhanced control over the operation of the insect control sprayer system (8). The programmable computer (29) may be a stand-alone personal computer or may be part of a "smart house" or automated home system. The programmable computer (29) may be programmed to commence and terminate the spraying of insecticide at any time. Additionally, the programmable computer (29) may report to the user the current insecticide level and whether a low level of insecticide condition exists.

Figure 6:
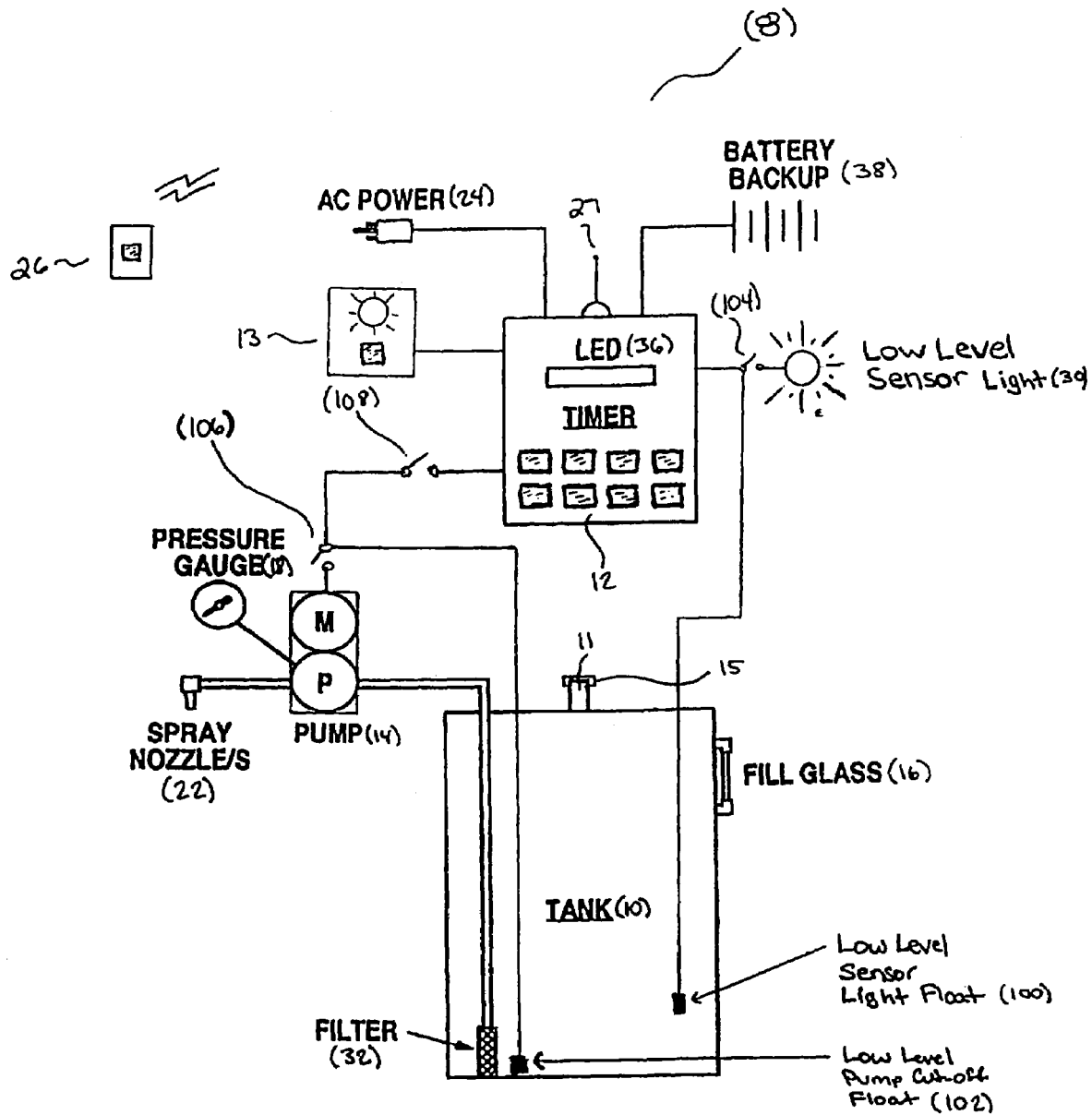
FIG. 6 illustrates an equipment diagram of an alternative embodiment of the insect spray system.

FIG. 6 is an equipment diagram of an alternate embodiment of Applicants' insect control sprayer system (8). In this embodiment, a pair of floats (100 and 102) are substituted for the low level sensor (28) of the first embodiment. The low level sensor light float (100) is connected to a normally open low level sensor light circuit (104). The low level pump cutoff float (100) is connected to a normally closed pump cutoff circuit (104). When the insecticide level within the container tank (10) reaches a first low level, the low level sensor light float (100) closes the low level sensor light circuit (104) causing the low level sensor light (30) to illuminate. If the insecticide within the container tank (10) is further depleted and reaches a second low level, the low level pump cutoff float (102) opens the pump cutoff circuit (106) preventing power from being provided to the pump (14) until insecticide is added to the container tank (10). When the insecticide in the container tank (10) is replenished, the sensor light float (100) opens the low level sensor light circuit (104) and the pump cutoff float (102) closes the pump cutoff circuit (106). A manual override circuit (108) is also provided. A user may open the normally closed manual override circuit (108) to prevent operation of the pump (14) notwithstanding the programming schedule of the control panel (12).

Figure 7:
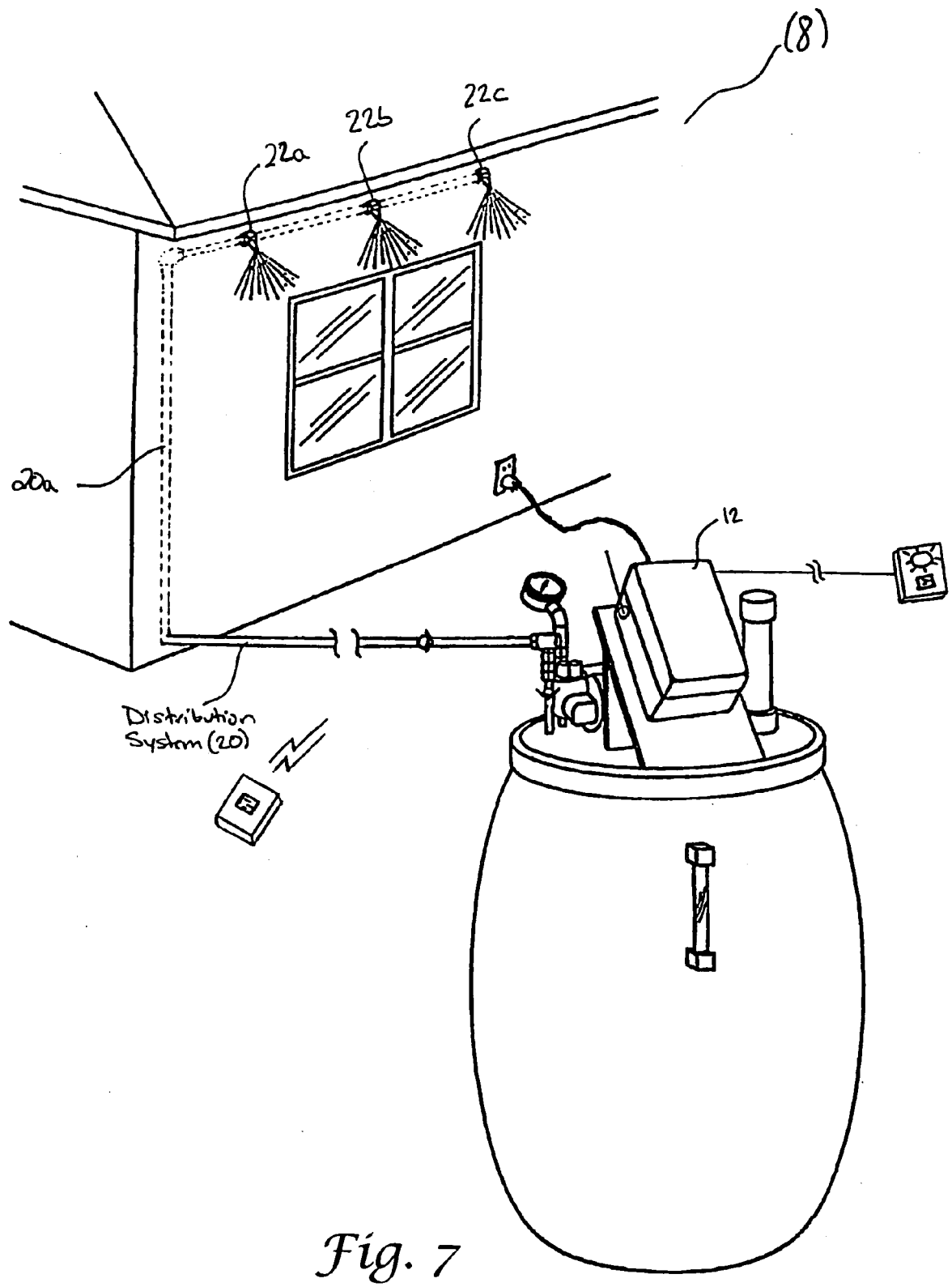
FIG. 7 illustrates a perspective view of an alternative embodiment of the insect spray system.

FIG. 7 illustrates an alternative embodiment of Applicants' insect control sprayer system (8). In this embodiment, the distribution system (20) is partially embedded (20*a*) within the structure of a building. This embodiment is more aesthetically pleasing to the user of the system as the only visible indicia of the system are the spray nozzles (22).

Figure 8:
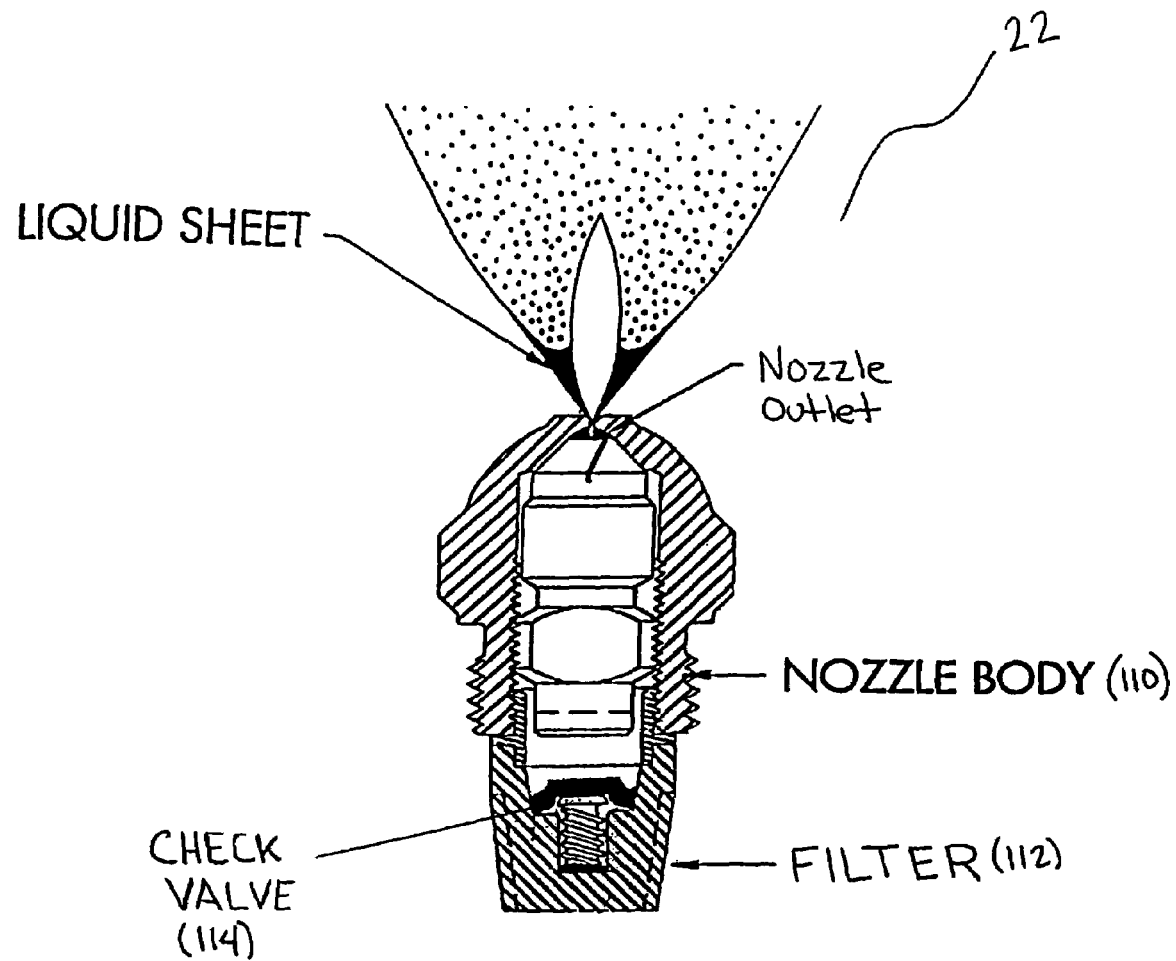
FIG. 8 illustrates section view of a spray nozzle.

FIG. 8 illustrates section view of a spray nozzle. The nozzles (22) are atomizing nozzles comprised of a stainless steel housing (110); a non-corrosive, bronze fine-mesh filter (112); and a check valve (114) to reduce or prevent dripping at the termination of a spray interval. A representative manufacturer of the nozzles is Hago.

Figure 9:
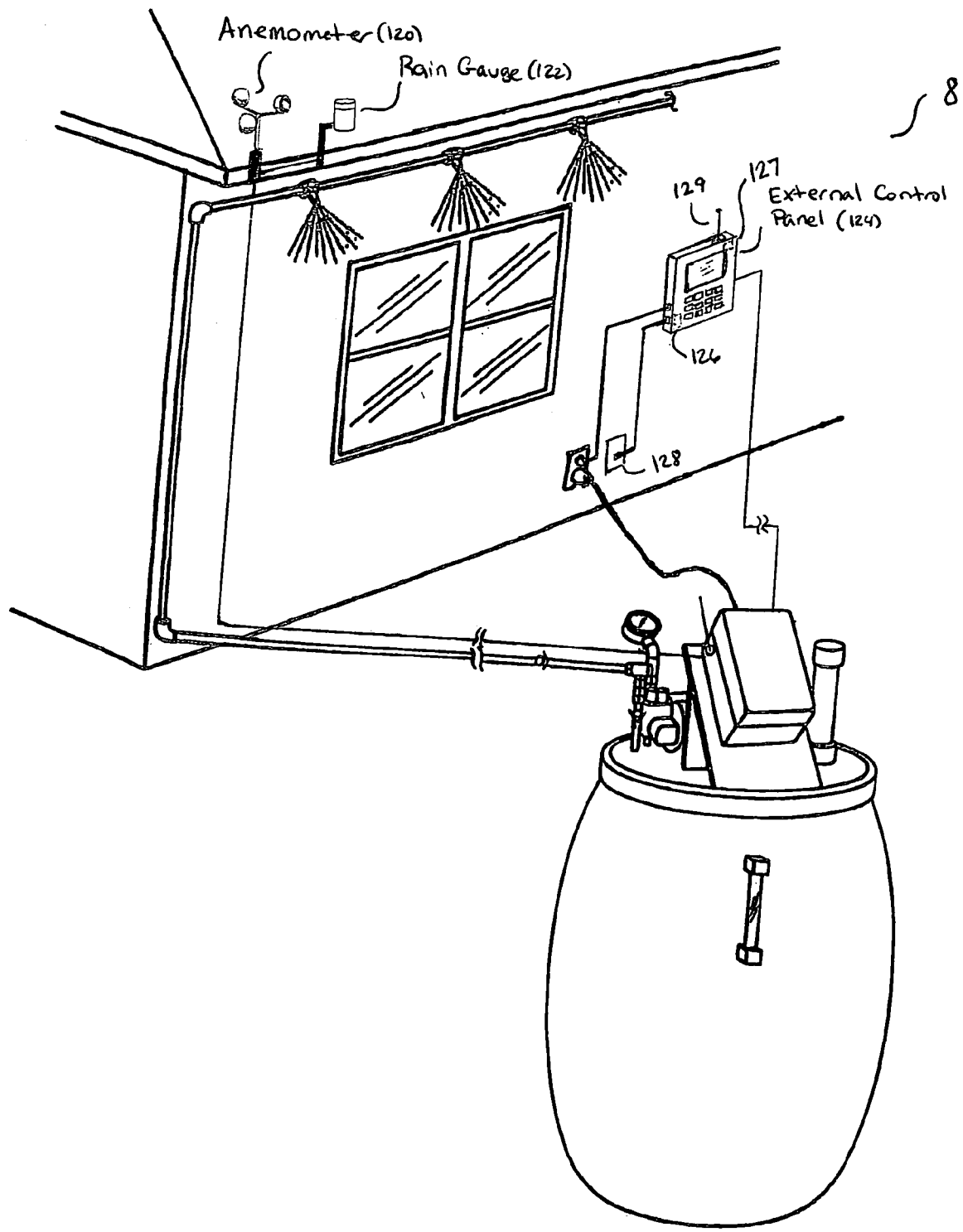
FIG. 9 illustrates a perspective view of an alternative embodiment of the insect spray system.
Figure 11:
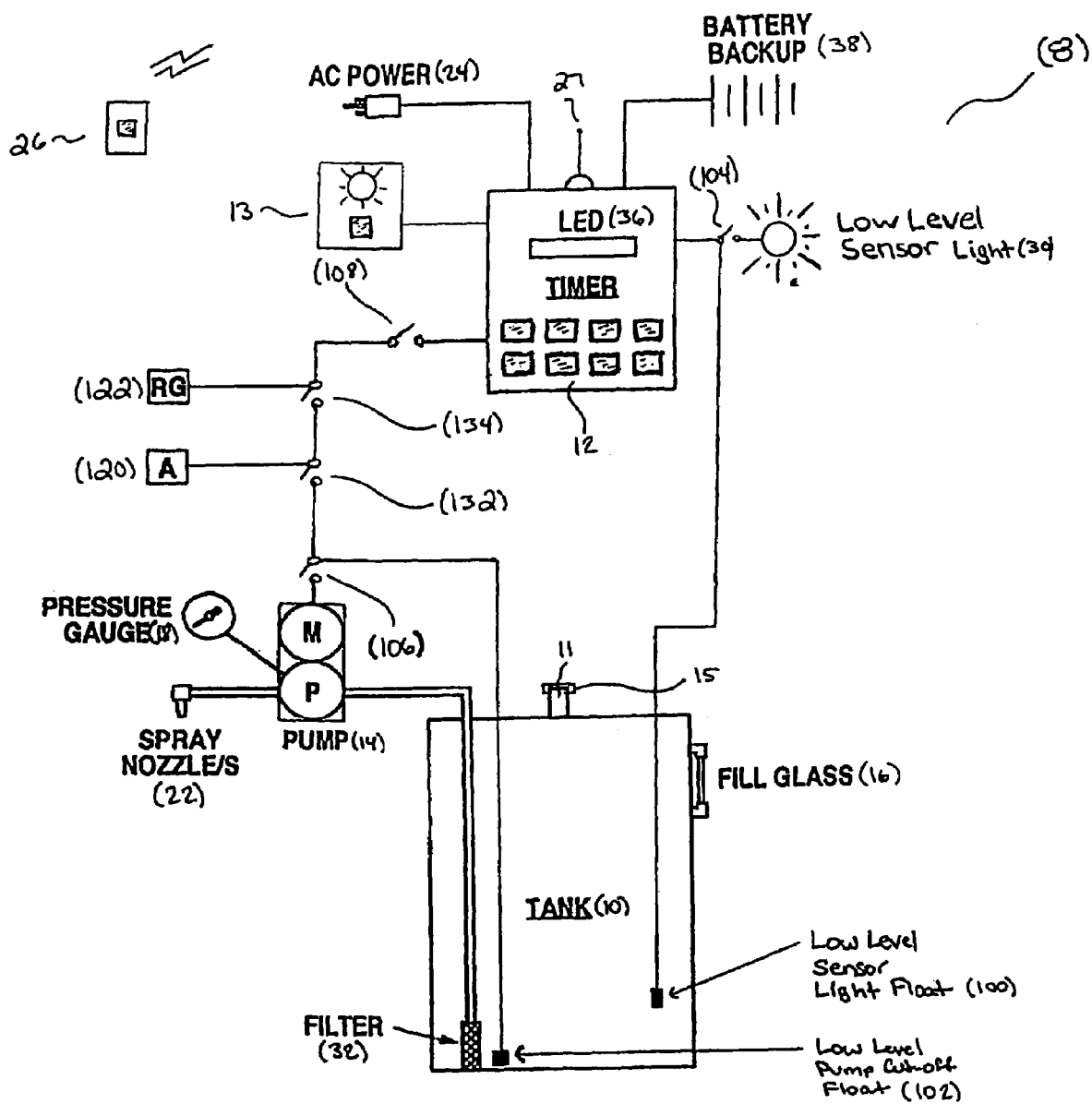
FIG. 11 illustrates an equipment diagram of one embodiment of the insect spray system.

Referring now to FIG. 9, it is seen another embodiment of the insect control sprayer system (8). In this embodiment it is seen that an anemometer (120) in communicative contact with the control panel (12) is provided. It is also seen that a rain gauge (122) in communicative contact with the control panel (12) may also be provided. In this embodiment, the insect control sprayer system (8) may be configured to prevent the dispensing of insecticide when conditions are such that it would be inappropriate or ineffective to spray insecticide. The anemometer (120) captures wind speed and, upon reaching a predetermined velocity, opens a normally closed circuit (Element 132 on FIG. 11) to de-energize the pump (14). When the wind speed drops below the predetermined velocity, the now-open circuit (132) is closed to allow the pump (14) to be energized. The maximum wind velocity at which the sprayer system (8) will be permitted to spray insecticide may either be set on the anemometer (120) itself via a selectable switch on the anemometer or by a setting available through the control panel (12). Interrupting or preventing a dispensing cycle during windy conditions saves insecticide, avoids property damage, and improves insecticide distribution uniformity. An example of an anemometer (120) that is suitable for use with the instant insect control sprayer system (8) is the Hunter® Wind-Clik® wind sensor.

The rain gauge (122) monitors rainfall levels and, upon reaching a determined amount of rain per a determined period of time, opens a normally closed circuit (Element 132 on FIG. 11) to de-energize the pump. The maximum amount of permitted rainfall per period of time may be set either on the rain gauge (122) itself via a selectable switch on the rain gauge or by a setting available through the control panel (12). An example of a rain gauge (122) that is suitable for use with the instant insect control sprayer system (8) is the Hunter® Rain-Clik® rain sensor.

Although both the anemometer (120) and the rain gauge (122) are shown in wired communicative contact with the control panel (12), it is to be understood that each may also be in wireless communicative contact with the control panel (12), as is well known in the art, and therefore be more easily positionable at any appropriate location.

Also seen in FIG. 9 is an external control panel (124). All of the programming and display features of the control panel (12) are available in the external control panel (124). The external control panel (124) may be in wired or wireless communicative contact with the control panel (12).

In some embodiments of the insect sprayer system (8) of the instant invention, the external control panel (124) will comprise a means to allow the sprayer system (8) to communicate with remote entities such as those that will maintain the spray system (8) or replenish supplies when a low-level condition is detected and exchange status information with those remote entities. Status information may include error or fault conditions such as low levels of insecticide or a failure of a component of the sprayer system (8) such as the pump (14). Status information may also include statistical information such as consumption rate and run times. In some embodiments, especially those embodiments without an external control panel (124), communications means may be located within control panel (12).

One means of communication is an integrated telephone automated dialer (126). The automated dialer (126) is connected to the telephone system of a home or business via a telephone jack (128). In some embodiments, the automated dialer (126) may be comprised of a cellular, mobile, or other wireless telephone so as to eliminate the need for a telephone jack (128). The external control panel (124) or control panel (12) may be programmed with the telephone numbers for individuals or entities which will maintain the insect control spray system (8) or replenish supplies therefore as needed. When a fault condition is detected or a low level condition is detected, the external control panel (124) may be programmed to automatically call an appropriate party, such as a service technician, with a pre-recorded message. An example of an automated dialer (126) that is suitable for use with the instant insect control sprayer system (8) is the Visonic®, Ltd. Speech Dialer, model DL-125C.

In another embodiment, the means of communications comprises a radio transmitter or transmitter/receiver (127). The radio transmitter/receiver (127) utilizes antenna (129) to communicate with a remote location (not shown) to report the detection of fault conditions or low level conditions. It is contemplated that the radio transmitter/receiver (127) may be used in place of or in conjunction with the automated dialer (126). Upon detection of a fault condition, low-level condition, or other condition requiring service, the radio transmitter/receiver (127) will transmit an analog or digital signal, which may or may not be encoded, on a determined frequency to a receiving station notifying the station of the identity of the sprayer system (8) requiring attention and the condition which prompted the transmission. The receiving station may transmit a response to the radio transmitter/receiver (127) of the sprayer system (8) indicating that the message has been received and/or that a service technician will be dispatched.

Figure 10:
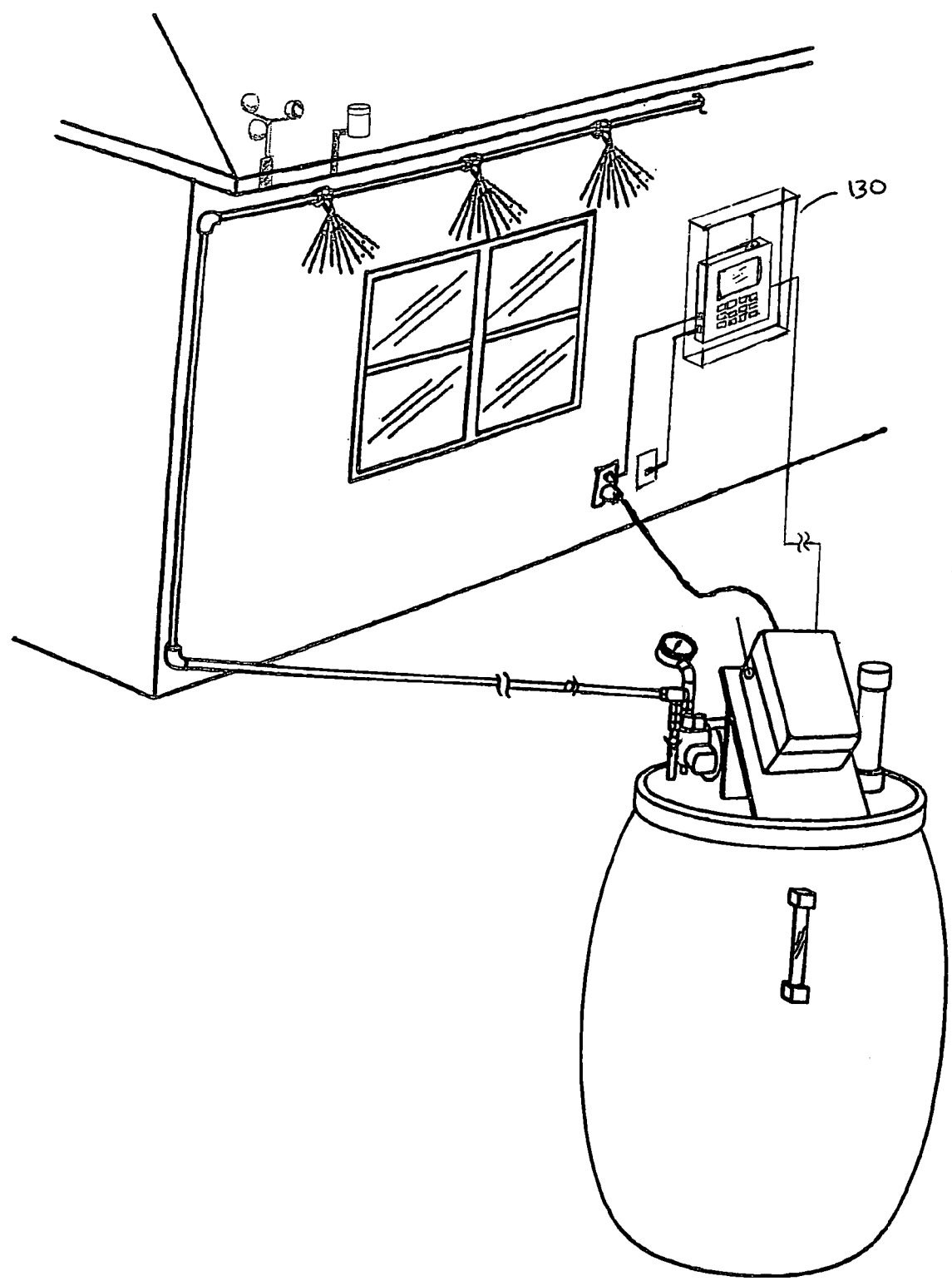
FIG. 10 illustrates a perspective view of an alternative embodiment of the insect spray system.

A weatherproof case (Item 130 of FIG. 10) may be provided to protect the external control panel from inclement weather.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed:

1. A mosquito and insect control system comprising:
   a container for containing a liquid insecticide, a fill tube connected thereto;
   a sight class engaged with the container for determining the insecticide level therein;
   a first float and a second float within the container;
   the first float operable to detect a first low level of insecticide condition within the container tank and visually indicate said first low level condition;
   the second float operable to detect a second low level of insecticide condition within the container tank and to de-energize the pump upon said second low level condition;
   a distribution system for delivering liquid insecticide from the container to a plurality of remote locations;
   a pump in operable engagement with the distribution system for pumping the liquid insecticide from the container to the plurality of remote locations;
   a programmable digital timer for controlling the pump operable to energize and de-energize the pump for a pre-selected duration of time at a pre-selected time;
   a handheld wireless remote control unit to manually energize and de-energize the pump from a remote location;
   a hardwired remote control unit to manually energize and de-energize the pump from a remote location; and
   nozzles at the removed end of the distribution system to direct the spray of insecticide, the nozzles being atomizing nozzles comprised of a stainless steel housing, a non-corrosive, bronze fine-mesh filter, and a check valve to reduce or prevent dripping at the termination of a spray interval;
   a pressure gauge to monitor the pressure of the insecticide within the distribution system;
   an anemometer to measure wind speed in the spray area of the insect control system and de-energize the pump when wind speed exceeds a determined limit;
   a rain gauge to measure rainfall amounts and de-energize the pump when rainfall exceeds a determined limit;
   a programmable external control panel in communicative contact with the programmable digital timer; and
   an automatic telephone dialer in communicative contact with a telephone circuit.

2. A mosquito and insect control system comprising:
a container for containing a liquid insecticide;
a distribution system for delivering liquid insecticide from the container to a plurality of remote locations;
nozzles at the removed end of the distribution system to direct the spray of insecticide; and
a pump in operable engagement with the distribution system for pumping the liquid insecticide from the container to the plurality of remote locations;
programmable digital timer for controlling the pump operable to energize and de-energize the pump for a pre-selected duration of time, at a pre-selected time;
a remote override unit and wherein the programmable digital timer controller is adapted to energize the pump and to de-energize the pump in response to a signal from the remote override;
a means for de-energizing the pump in response to determined weather conditions.

3. The mosquito and insect control system of claim 2 wherein the means for de-energizing the pump in response to determined weather conditions is an anemometer, the anemometer measuring wind speed in the spray area of the insect control system. and de-energizing the pump when wind speed exceeds a determined limit.

4. The mosquito and insect control system of claim 2 wherein the means for de-energizing the pump in response to determined weather conditions is a rain gauge, the rain gauge measuring rainfall amounts over a determined period and de-energizing the pump when rainfall exceeds a determined limit.

5. The mosquito and insect control system of claim 2 further comprising a programmable external control panel in communicative contact with the programmable digital timer, the programmable external control panel comprising a telephone circuit and an automatic telephone dialer.

6. The mosquito and insect control system of claim 2 wherein the container for containing a liquid insecticide is comprised of a container lid and a container tank and wherein the container lid is secured to the container tank with a fastening strap, the fastening strap comprising a latching mechanism at the disposed ends thereof and secured with a tamper proof seal.

7. The mosquito and insect control system of claim 6 wherein the container for containing a liquid insecticide further comprises a fill tube connected thereto and a fill tube cap at the distal end of the fill tube, the fill tube cap secured to the fill tube with a tamper proof seal.

8. The mosquito and insect control system of claim 2 wherein the pump remains energized only so long as a continuous signal from the remote override unit is received; the pump being de-energized when the signal terminates.

9. The mosquito and insect control system of claim 2 wherein the pump is energized in response to a first signal from the remote override unit and is de-energized in response to a second signal from the remote override unit.

10. The mosquito and insect control system of claim 2 wherein the programmable digital timer controller is adapted to operate from an alternating current power source.

11. The mosquito and insect control system of claim 2 wherein the programmable digital timer controller includes a backup direct current power source.

12. A mosquito and insect control system comprising:
a container for containing a liquid insecticide;
a distribution system for delivering liquid insecticide from the container to a plurality of remote locations;
nozzles at the removed end of the distribution system to direct the spray of insecticide; and
a pump in operable engagement with the distribution system for pumping the liquid insecticide from the container to the plurality of remote locations;
programmable digital timer for controlling the pump operable to energize and de-energize the pump for a pre-selected duration of time at a pre-selected time;
a first float and a second float;
the first float operable to detect a first low level of insecticide condition within the container tank and visually indicate said first low level condition;
the second float operable to detect a second low level of insecticide condition within the container tank and to de-energize the pump upon said second low level condition; and
a means for de-energizing the pump in response to determined weather conditions.

13. The mosquito and insect control system of claim 12 wherein the means for de-energizing the pump in response to determined weather conditions is an anemometer, the anemometer measuring wind speed in the spray area of the insect control system and de-energizing the pump when wind speed exceeds a determined limit.

14. The mosquito and insect control system of claim 12 wherein the means for de-energizing the pump in response to determined weather conditions is a rain gauge, the rain gauge measuring rainfall amounts over a determined period and de-energizing the pump when rainfall exceeds a determined limit.

15. The mosquito and insect control system of claim 12 further comprising a programmable external control panel in communicative contact with the programmable digital timer, the programmable external control panel comprising an automatic telephone dialer in communicative contact with a telephone circuit.

16. The mosquito and insect control system of claim 12 wherein the container for containing a liquid insecticide is comprised of a container lid and a container tank and wherein the container lid is secured to the container tank with a fastening strap, the fastening strap comprising a latching mechanism at the disposed ends thereof and secured with a tamper proof seal.

17. The mosquito and insect control system of claim 16 wherein the container for containing a liquid insecticide further comprises a fill tube connected thereto and a fill tube cap at the distal end of the fill tube, the fill tube cap secured to the fill tube with a tamper proof seal.

18. A mosquito and insect control system comprising:
a container for containing a liquid insecticide;
a distribution system for delivering liquid insecticide from the container to a plurality of remote locations;
nozzles at the removed end of the distribution system to direct the spray of insecticide; and
a pump in operable engagement with the distribution system for pumping the liquid insecticide from the container to the plurality of remote locations;
programmable digital timer for controlling the pump operable to energize and de-energize the pump for a pre-selected duration of time at a pre-selected time, said programmable digital timer controller adapted to visually indicate a low level of insecticide condition within the container;
a low level sensor to signal the programmable digital timer controller at pre-selected levels of insecticide within the container;
a means for de-energizing the pump in response to determined weather conditions; and a communications means for sending status information to a remote location and receiving acknowledgements from the remote location.

19. The mosquito and insect control system of claim 18 wherein the means for de-energizing the pump in response to determined weather conditions is an anemometer, the anemometer measuring wind speed in the spray area of the insect control system and de-energizing the pump when wind speed exceeds a determined limit.

20. The mosquito and insect control system of claim 18 wherein the means for de-energizing the pump in response to determined weather conditions is a rain gauge, the rain gauge measuring rainfall amounts over a determined period and de-energizing the pump when rainfall exceeds a determined limit.

21. The mosquito and insect control system of claim 18 wherein the communications means comprises an automatic telephone dialer in communicative contact with a telephone circuit.

22. The mosquito and insect control system of claim 18 wherein the communications means comprises a radio transmitter and receiver.

23. The mosquito and insect control system of claim 18 further comprising a programmable external control panel in communicative contact with the programmable digital timer.

24. The mosquito and insect control system of claim 18 wherein the container for containing a liquid insecticide is comprised of a container lid and a container tank and wherein the container lid is secured to the container tank with a fastening strap, the fastening strap comprising a latching mechanism at the disposed ends thereof and secured with a tamper proof seal.

25. The mosquito and insect control system of claim 24 wherein the means for de-energizing the pump in response to determined weather conditions is an anemometer, the anemometer measuring wind speed in the spray area of the insect control system and de-energizing the pump when wind speed exceeds a determined limit.

26. The mosquito and insect control system of claim 24 wherein the means for de-energizing the pump in response to determined weather conditions is a rain gauge, the rain gauge measuring rainfall amounts over a determined period and de-energizing the pump when rainfall exceeds a determined limit.

27. The mosquito and insect control system of claim 24 wherein the communications means comprises an automatic telephone dialer in communicative contact with a telephone circuit.

28. The mosquito and insect control system of claim 24 wherein the communications means comprises a radio transmitter and receiver.

29. The mosquito and insect control system of claim 28 wherein the container for containing a liquid insecticide further comprises a fill tube connected thereto and a fill tube cap at the distal end of the fill tube, the fill tube cap secured to the fill tube with a tamper proof seal.

30. The mosquito and insect control system of claim 24 further comprising a programmable external control panel in communicative contact with the programmable digital timer.

31. The mosquito and insect control system of claim 24 wherein the container for containing a liquid insecticide is comprised of a container lid and a container tank and wherein the container lid is secured to the container tank with a fastening strap, the fastening strap comprising a latching mechanism at the disposed ends thereof and secured with a tamper proof seal.

32. The mosquito and insect control system of claim 24 wherein the container for containing a liquid insecticide further comprises a fill tube connected thereto and a fill tube cap at the distal end of the fill tube, the fill tube cap secured to the fill tube with a tamper proof seal.

33. A mosquito and insect control system comprising:
a container for containing a liquid insecticide;
a distribution system for delivering liquid insecticide from the container to a plurality of remote locations;
nozzles at the removed end of the distribution system to direct the spray of insecticide, wherein the nozzle ends are flexible to permit directional adjustments of the insecticide spray; and
a pump in operable engagement with the distribution system for pumping the liquid insecticide from the container to the plurality of remote locations;
programmable digital timer for controlling the pump operable to energize and de-energize the pump for a pre-selected duration of time at a pre-selected time; and
a means for de-energizing the pump in response to determined weather conditions;
a communications means for sending status information to a remote location and receiving acknowledgements from the remote location.

34. An automated method of applying insecticide to an area providing a pump, a container adapted to receive a liquid insecticide, a distribution system with a plurality of nozzles to direct the spray of the liquid insecticide, a programmable digital timer, and a
remote override transmitter, comprising the steps of:
directing the spray of insecticide with the plurality of nozzles;
defining discrete intervals for insecticide application;
defining the duration of application for each of the defined intervals;
initiating the application of insecticide by energizing the pump at the beginning of each interval;
terminating the application of insecticide by de-energizing the pump at the expiration of the allotted time for the indicated interval;
allowing the transmitting signals from the remote override transmitter to initiate and terminate application of insecticide; and
terminating the application of insecticide by de-energizing the pump in high wind or rain conditions.

* * * * *